United States Patent
Liu et al.

(10) Patent No.: US 9,947,292 B2
(45) Date of Patent: Apr. 17, 2018

(54) IMAGE PROCESSING METHOD AND DEVICE

(71) Applicant: Xiaomi Inc., Beijing (CN)

(72) Inventors: Anyu Liu, Beijing (CN); Guosheng Li, Beijing (CN); Hui Du, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 15/233,959

(22) Filed: Aug. 11, 2016

(65) Prior Publication Data

US 2016/0351163 A1 Dec. 1, 2016

Related U.S. Application Data

(63) Continuation of application No. PCT/CN2015/093401, filed on Oct. 30, 2015.

(30) Foreign Application Priority Data

Jan. 13, 2015 (CN) .......................... 2015 1 0017636

(51) Int. Cl.
 *G09G 5/02* (2006.01)
 *G06T 11/00* (2006.01)
 (Continued)

(52) U.S. Cl.
 CPC .............. *G09G 5/02* (2013.01); *G06T 11/001* (2013.01); *G09G 3/20* (2013.01); *H04N 5/20* (2013.01);
 (Continued)

(58) Field of Classification Search
 CPC ................................ G06T 11/001; G09G 5/02
 (Continued)

(56) References Cited

U.S. PATENT DOCUMENTS

2004/0156549 A1* 8/2004 Persiantsev ............ H04N 19/63
 382/236
2009/0041348 A1 2/2009 Someya et al.
 (Continued)

FOREIGN PATENT DOCUMENTS

CN 101118733 A 2/2008
CN 101567965 A 10/2009
 (Continued)

OTHER PUBLICATIONS

Office action from JPO for JP application 2016544461 dated Sep. 26, 2017.
 (Continued)

*Primary Examiner* — Ke Xiao
*Assistant Examiner* — Andrew Shin
(74) *Attorney, Agent, or Firm* — Jun He Law Offices P.C.; James J. Zhu (57) ABSTRACT

An image processing method and device are provided. The method includes: choosing content-associated sub pixels in an image to be processed; obtaining an initial color level value of each of the content-associated sub pixels in the image to be processed; adding to least one digit to an end of the initial color level value and assigning a preset value to each added digit so as to obtain a processed color level value; and replacing the initial color level value with the processed color level value.

17 Claims, 5 Drawing Sheets

(51) Int. Cl.
*H04N 5/20* (2006.01)
*G09G 3/20* (2006.01)
*H04N 9/64* (2006.01)

(52) U.S. Cl.
CPC ..... *H04N 9/646* (2013.01); *G09G 2340/0457* (2013.01)

(58) Field of Classification Search
USPC .................. 345/581, 589, 600, 605; 382/162
See application file for complete search history.

(56) References Cited

U.S. PATENT DOCUMENTS

| | | | |
|---|---|---|---|
| 2009/0251483 A1* | 10/2009 | Hsu | G09G 3/2055 345/589 |
| 2010/0134496 A1* | 6/2010 | Bhaskaran | G06T 5/002 345/428 |
| 2011/0149122 A1* | 6/2011 | Subbotin | G06T 5/20 348/242 |

FOREIGN PATENT DOCUMENTS

| | | |
|---|---|---|
| CN | 102087841 A | 6/2011 |
| CN | 104618701 A | 5/2015 |
| JP | 2004054210 A | 2/2004 |
| JP | 2011133683 A | 7/2011 |
| JP | 2014220663 A | 11/2014 |

OTHER PUBLICATIONS

International search report and written opinions for PCT application CN2015093401 dated Feb. 5, 2016.

* cited by examiner

IMAGE PROCESSING METHOD AND DEVICE

CROSS-REFERENCE TO RELATED APPLICATION

This application is a Continuation application of International Application No. PCT/CN2015/093401, filed with the State Intellectual Property Office of P. R. China on Oct. 30, 2015, which is based on and claims priority to Chinese Patent Application Serial No. CN201510017636.1, filed with the State Intellectual Property Office of P. R. China on Jan. 13, 2015, the entire content of which is incorporated herein by reference.

FIELD

The present disclosure relates to image processing technology filed, and more particularly, to an image processing method and device.

BACKGROUND

With the development of image processing technology, a user may watch static images or videos, such as photography works, or a video chat with a family member, on screens of various electronic devices like a TV, a computer and a cell phone.

When an electronic device displays a static image or a frame image of a video, the static image or the frame image actually consists of a number of pixels. Then, by controlling the display color of each of the pixels, a complete image may be displayed on the screen of the electronic device.

Specifically, each pixel may be divided into a plurality of sub pixels, for example, for a electronic device using a RGB sub-pixel mode, each pixel of which contains a sub pixel of a red channel (Red, denoted as "R" in "RGB"), a sub pixel of a green channel (Green, denoted as "G" in "RGB") and a sub pixel of a blue channel (Blue, denoted as "B" in "RGB"). Then, by controlling the color level value of each sub pixel, multiple combinations may be obtained from the three sub pixels, thus obtaining multiple pixel colors.

SUMMARY

According to embodiments of a first aspect of the present disclosure, an image processing method is provided. The method includes: choosing content-associated sub pixels in an image to be processed; obtaining an initial color level value of each of the content-associated sub pixels in the image to be processed; adding at least one digit to an end of the initial color level value, and assigning a preset value to each added digit, so as to obtain a processed color level value; and replacing the initial color level value with the processed color level value.

According to embodiments of a second aspect of the present disclosure, an electronic device is provided. The electronic device includes: a processor; and a memory, configured to store instructions executable by the processor. The processor is configured to: choose content-associated sub pixels in an image to be processed; obtain an initial color level value of each of the content-associated sub pixels in the image to be processed; add at least one digit to an end of the initial color level value, and assign a preset value to each added digit, so as to obtain a processed color level value; and replace the initial color level value with the processed color level value.

According to embodiments of a third aspect of the present disclosure, a non-transitory computer-readable storage medium is provided. The storage medium has stored therein instructions that, when executed by a processor of an electronic device, causes the electronic device to perform an image processing method. The method includes: choosing content-associated sub pixels in an image to be processed; obtaining an initial color level value of each of the content-associated sub pixels in the image to be processed; adding at least one digit to an end of the initial color level value, and assigning a preset value to each added digit, so as to obtain a processed color level value; and replacing the initial color level value with the processed color level value.

It should be understood that, the above general description and following detailed description are exemplary and explanatory, and shall not be construed to limit the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
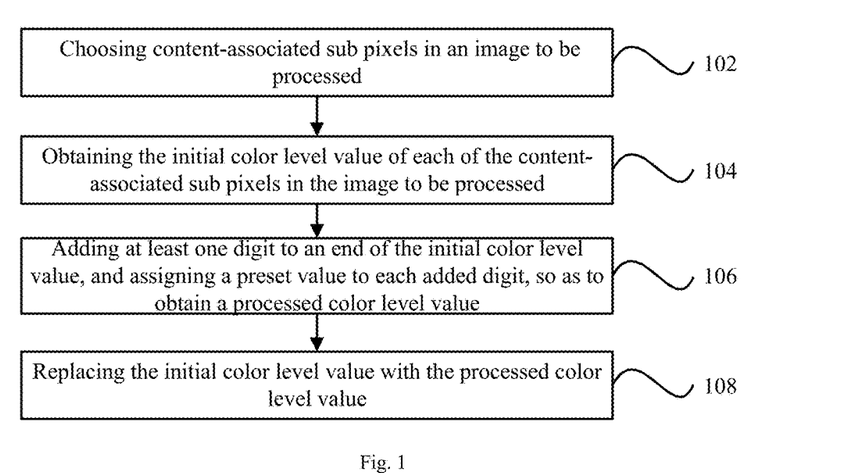
FIG. 1 is a flow chart of an image processing method according to an exemplary embodiment.

FIG. 1 is a flow chart of an image processing method according to an exemplary embodiment. As shown in FIG. 1, the method is applied to a terminal and comprises the following steps.

In step 102, content-associated sub pixels are chosen in an image to be processed.

In the present disclosure, "content-associated sub pixels" are sub pixels having content association with the image to be processed. The content association may be determined based on conditions such as a spacing distance between sub pixels or a difference between their color level values.

In an exemplary embodiment, any adjacent sub pixels may be chosen in the image to be processed; and if there is a difference between the initial color level values of the adjacent sub pixels, and the difference is less than or equal to a preset value, the adjacent sub pixels are determined as content-associated sub pixels.

In another exemplary embodiment, any adjacent pixels may be chosen in the image to be processed; and if there is a difference between the initial color level values of sub pixels in a same color channel of the adjacent pixels, and the difference is less than or equal to a preset value, the sub pixels in the same color channel of the adjacent pixels are determined as content-associated sub pixels.

The "preset value" used to compare with the difference between initial color level values may be a fixed value, or a value determined based on an actual situation, for example, the preset value has an inverse correlation with the pixel density of a display for the image to be processed.

In step 104, the initial color level value of each of the content-associated sub pixels in the image to be processed is obtained.

In step 106, at least one digit is added to the end of the initial color level value, and a preset value is assigned to each added digit, so as to obtain a processed color level value.

In the present disclosure, via adding digits, i.e. a "supplementing" process, the number of color levels expressible by the chosen sub pixels is increased. In other words, although the color level values of the content-associated sub pixels do not change much, the variation between the color level values of the adjacent content-associated sub pixels becomes smaller, thus smoothing the color change of the image, and eliminating the color stratification.

In an exemplary embodiment, a random number may be assigned to each added digit, so as to obtain the processed color level value. In the present embodiment, the image color stratification may be eliminated conveniently with a small amount of computation and a quick processing speed.

In another exemplary embodiment, associated sub pixels in a preset association area of each content-associated sub pixel may be determined, in which the associated sub pixels comprise all sub pixels in the preset association area, or comprise sub pixels in the preset association area and belonging to a same color channel as the content-associated sub pixel. At least one digit is added to the end of the initial color level value of each associated sub pixel, and 0 is assigned to each added digit, so as to obtain a preliminary value of the processed color level. The same numbers of digits are added to the end of the initial color level value of each associated sub pixel. Then, the processed color level value of the content-associated sub pixel is determined according to a value range corresponding to the preliminary values of processed color levels of the associated sub pixels, in which the processed color level value is within the value range. In the present embodiment, the image color stratification may be eliminated accurately and effectively.

Specifically, an average value of the preliminary values of processed color levels corresponding to the associated sub pixels may be calculated, wherein the average value is the processed color level value of the content-associated sub pixel.

In step 108, the initial color level value is replaced with the processed color level value.

It can be seen from above embodiments that, in the present disclosure, by adding at least one digit to each content-associated pixel, the digits of the color level values of these sub pixels are increased. For example, by changing from 6 bits to 8 bits, the variation between the color level values of adjacent content-associated sub pixels becomes smaller, thus reducing image color stratification caused by drastic change in color level value, and improving the display effect of the image.

With the schematic diagrams for arranging pixels and choosing sub pixels as shown in FIGS. 2-5, the technique solution of the present disclosure is further described.

1. Content-Associated Sub Pixels

In an exemplary embodiment, when choosing the content-associated sub pixels, all the sub pixels are treated equally, without distinguishing the color channels to which the sub pixels belong.

Figure 2:
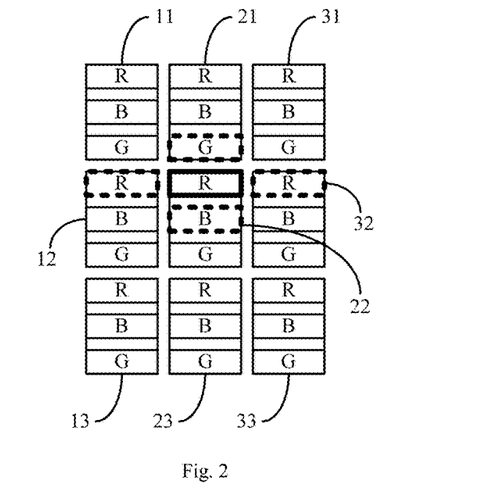
FIGS. 2-4 are schematic diagrams for arranging pixels and choosing sub pixels according to exemplary embodiments.

Assuming pixels of a terminal screen are arranged in an RGB arrangement manner, as shown in FIG. 2. When determining content-associated sub pixels of a sub pixel in a red channel of pixel 22, any sub pixel adjacent to the sub pixel in the red channel of the pixel 22 may be chosen, without distinguishing the color channel, and then the content-associated sub pixels are chosen from the adjacent sub pixels.

As shown in FIG. 2, firstly, we may, for example, choose the adjacent sub pixels those are above, below, on the left side of, or on the right side of the sub pixel in the red channel of the pixel 22, including: a sub pixel in a green channel of a pixel 21, a sub pixel in a blue channel of the pixel 22, a sub pixel in a red channel of a pixel 12 and a sub pixel in a red channel of a pixel 32. Then, by comparing the color level value of the adjacent sub pixel with the color level value of the current sub pixel, the content-associated sub pixels may be determined.

TABLE 1

| Adjacent sub pixels | Color level values of the adjacent sub pixels | Color level value of current sub pixel | Difference |
|---|---|---|---|
| 21-G | 5 | 5 | 0 |
| 22-B | 6 | | 1 |
| 12-R | 8 | | 3 |
| 32-R | 2 | | 3 |

For example, the initial color level values of the five sub pixels are shown in Table 1. If there is a difference between the initial color level value of the sub pixel in the red channel of pixel 22 and the initial color level value of a certain adjacent sub pixel, and the difference is less than or equal to a preset value, the adjacent sub pixel and the sub-pixel in the red channel of pixel 22 are determined as the content-associated sub pixels. Specifically, the "preset value" may be a fixed value; or a value determined according to a pixel density of the terminal screen, which has an inverse correlation with the pixel density, for example, when the pixel density is PPI (Pixels Per Inch) the preset value may be 1, and when the pixel density is PPI≈200, the preset value may be 4.

If the PPI of the screen of the terminal is 442, i.e., the preset value is 1, then the sub pixel in the red channel of the pixel 22 is content-associated with sub pixel (22-B) in the blue channel of the pixel 22, and thus both of them are content-associated sub pixels to each other.

In another exemplary embodiment, when choosing the content-associated sub pixels, the color channels of the sub pixels are distinguished, i.e., sub pixels in each color channel are compared separately.

Figure 3:
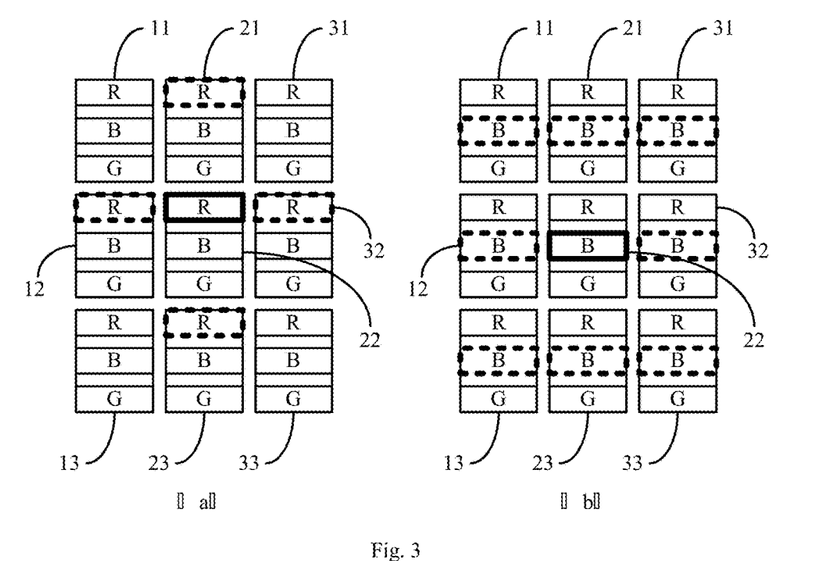

As shown in FIG. 3(*a*), the pixels are still arranged in an RGB arrangement manner as shown in FIG. 2. To determine content-associated sub pixels of the sub pixels in the red channel of the pixel 22, pixels adjacent to the pixel 22 need to be chosen to compare the sub pixels in the red channel of these adjacent pixels with the sub-pixel in the red channel of the pixel 22.

For example, as shown in FIG. 3(*a*), we may firstly choose the adjacent pixels above, below, on the left side of, or on the right side of the pixel 22, including a pixel 21, a pixel 23, a pixel 12, and a pixel 32, and then choose the sub pixels in the red channel of these adjacent pixels, and compare the sub pixels in the red channel of these adjacent pixels respectively with the sub pixels in the red channel of the pixel 22, such that the content-associated sub pixels may be determined.

TABLE 2

| Adjacent sub pixels | Color level values of the adjacent sub pixels | Color level value of current sub pixel | Difference |
|---|---|---|---|
| 21-R | 6 | 5 | 1 |
| 22-R | 7 |   | 2 |
| 12-R | 8 |   | 3 |
| 32-R | 2 |   | 3 |

For example, the initial color level values of the five sub pixels are shown in Table 2. If there is a difference between the initial color level value of the sub pixel in the red channel of the pixel 22 and the initial color level value of a certain adjacent sub pixel, and the difference is less than or equal to a preset value, the adjacent sub pixel and the sub pixel in the red channel of the pixel 22 are determined as the content-associated sub pixels.

If the PPI of the terminal screen is 442, i.e., the preset value is 1, then the sub pixel in the red channel of the pixel 22 is content-associated with the sub pixel (21-R) in the red channel of the pixel 21, and thus they are content-associated sub pixels to each other.

It should be noted that, the "adjacent sub pixels" in FIG. 2 and the "adjacent pixels" in FIG. 3(*a*) are both illustrated by using "above, below, left, right" as examples. However, the "adjacent" status obviously may comprise other situations, which should not be limited in the present disclosure. For example, as shown in FIG. 3(*b*), the "adjacent" relationship may comprise both "above, below, left, right" and "upper left, upper right, lower left, lower right". Then, according to the exemplary embodiments, in which "distinguishing color channels" is implemented, when choosing the content-associated sub pixels of the sub pixel in the blue channel of the pixel 22, the pixel 11, the pixel 12, the pixel 13, the pixel 21, the pixel 23, the pixel 31, the pixel 32 and the pixel 33 may be chosen as the adjacent pixels of the pixel 22.

2. Initial Color Level Values

The color level value of each sub pixel in the screen is controlled by a display control chip. Specifically, each color level value is expressed in a corresponding binary data in the display control chip. The binary data with different digit lengths may be used by the display control chip to express the color level value. For example, when the digit length of the color level value is 6 bit, each sub pixel has $2^6$ color level values, and then $(2^6)^3=262144$ colors may be realized when three sub pixels of the pixel are combined, thus representing 262144 colors by each pixel. When the digit length of the color level value is 8 bit, each sub pixel has $2^8$ color level values, and then $(2^8)^3=16777216$ colors may be realized when three sub pixels of the pixel are combined, thus representing 16777216 colors by each pixel.

The initial color level value refers to the color level value of each sub pixel in an image to be processed. According to the chosen content-associated sub pixels, we may need to correct the initial color level values of the chosen sub pixels, so as to eliminate the image color stratification, and to achieve a better image display effect.

Taking the initial color level values of sub pixels shown in FIG. 1 as an example, when the image to be processed records the color level values using 8 bit, the corresponding binary values are as shown in Table 3.

TABLE 3

| Adjacent sub pixels | Color level values of the adjacent sub pixels | Binary value |
|---|---|---|
| 21-G | 5 | 00000101 |
| 22-B | 6 | 00000110 |
| 12-R | 8 | 00001000 |
| 32-R | 2 | 00000010 |

3. Supplementing Process

For the content-associated sub pixels, at least one digit needs to be added to the end of the initial color level value, and assign a preset value to each added digit, so as to realize the supplementing process, thus realizing an accurate process on the image to be displayed.

Taking Table 3 as an example, if the supplementing process needs to be performed on the sub pixel 22-B, then the 8-bit binary value "00000110" corresponding to the initial color level value is used as the first 8 digits of the n-bit binary value, and the following n−8 digits of the n-bit binary value are assigned with values. For example, if n=10, then the obtained color level value with 10 bits is "00000110*#", in which, "*" and "#" are the added digits.

In an exemplary embodiment, a random number may be assigned to each added digit, so as to obtain the processed color level value.

For example, when changing a 8-bit color level to a 10-bit color level, two added digits "*#" may have four possibilities: 00, 01, 10, and 11, and the effect of the supplementing process may be realized by assigning a random number to each added digit.

In another exemplary embodiment, the value assigned to each added digit may be calculated according to the initial color level values of the associated sub pixels in a preset association area of each content-associated sub pixel, so as to realize a more accurate assignment and a better image display effect. The process is illustrated as follows.

(1) The associated sub pixels in a preset association area of each content-associated sub pixel are determined.

The size of the preset association area may be determined according to an actual requirement. For example, if there is no need to distinguish the color channels, the size of the preset association area may be smaller, as shown in FIG. 4(*a*), and associated sub pixels corresponding to the currently chosen sub pixel 22-R (i.e. the sub pixel in the red channel of the pixel 22) comprise: a sub pixel 11-G, a sub pixel 12-R, a sub pixel 12-B, a sub pixel 21-G, a sub pixel 22-B, a sub pixel 31-G, a sub pixel 32-R, and a sub pixel 32-B.

Figure 4:
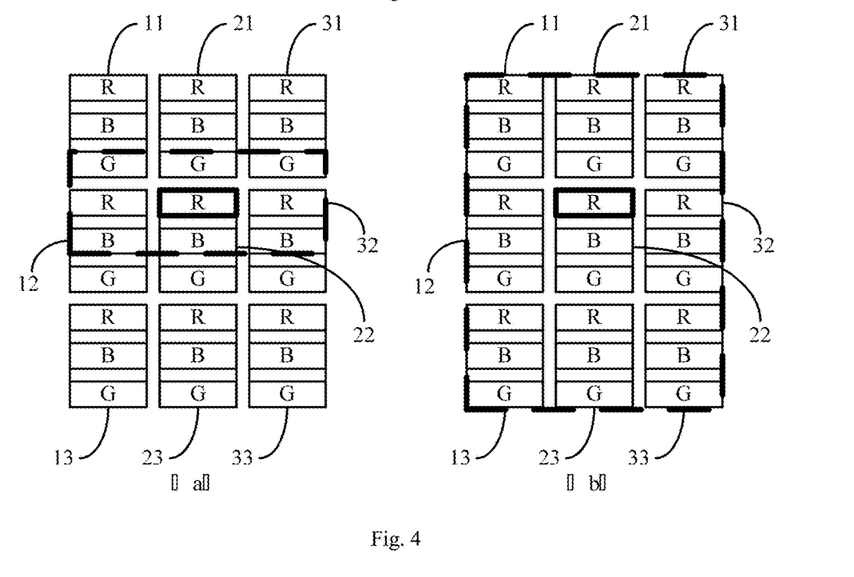

If there is a need to distinguish the color channels, the size of the preset association area may be larger, as shown in FIG. 4(*b*), the associated sub pixels corresponding to the currently chosen sub pixel 22-R comprise: the sub pixel 11-R, the sub pixel 12-R, a sub pixel 13-R, a sub pixel 21-R, a sub pixel 23-R, a sub pixel 31-R, the sub pixel 32-R, and a sub pixel 33-R.

(2) At least one digit is added to the end of the initial color level value of each associated sub pixel, and 0 is assigned to each added digit, so as to obtain an preliminary value of the processed color level, in which each associated sub pixel is added with a same number of digits.

Taking the chosen sub pixel 22-R as an example, if the associated sub pixels are the sub pixel 21-G and the sub pixel 22-B as shown in Table 1, the 8-bit binary value is shown in Table 4. Then, by adding two digits to each binary value and assigning 0 to the added two digits, preliminary values of processed color levels may be obtained, and the result is shown in Table 5.

TABLE 4

| 21-G | 0 | 0 | 0 | 0 | 0 | 1 | 0 | 1 |
|------|---|---|---|---|---|---|---|---|
| 22-R | 0 | 0 | 0 | 0 | 0 | 1 | 0 | 1 |
| 22-B | 0 | 0 | 0 | 0 | 0 | 1 | 1 | 0 |

TABLE 5

| 21-G | 0 | 0 | 0 | 0 | 0 | 1 | 0 | 1 | 0 | 0 |
|------|---|---|---|---|---|---|---|---|---|---|
| 22-R | 0 | 0 | 0 | 0 | 0 | 1 | 0 | 1 | 0 | 0 |
| 22-B | 0 | 0 | 0 | 0 | 0 | 1 | 1 | 0 | 0 | 0 |

(3) The processed color level value of the content-associated sub pixel is determined according to a value range corresponding to the preliminary values of processed color levels of the associated sub pixels, in which the processed color level value is within the value range.

As shown in Table 5, if the preliminary values of processed color levels corresponding to the sub pixel 21-G, the sub pixel 22-R and the sub-pixel 22-B are respectively 20, 20 and 24 in decimal format, the value range is 20~24, and thus the processed color level value corresponding to the sub pixel 22-R may be set as any value within the value range of 20~24.

In an exemplary embodiment, an average value of the preliminary values of processed color levels corresponding to the associated sub pixels may be calculated, in which the average value is the processed color level value of the content-associated sub pixel. Then, the average value of the preliminary values of processed color levels corresponding to the sub pixel 21-G and the sub pixel 22-B is (20+24)/2=22, and the processed color level values corresponding to respective sub pixels are shown in Table 6. Obviously, except for the average value, other values such as a weighted average value may also be used for calculating the processed color level value of each content-associated sub pixel, which should not be limited in the present disclosure.

TABLE 6

| 21-G | 0 | 0 | 0 | 0 | 0 | 1 | 0 | 1 | 0 | 0 |
|------|---|---|---|---|---|---|---|---|---|---|
| 22-R | 0 | 0 | 0 | 0 | 0 | 1 | 0 | 1 | 1 | 0 |
| 22-B | 0 | 0 | 0 | 0 | 0 | 1 | 1 | 0 | 0 | 0 |

It should be noted that, in the present technical solution, by adding digits to the color level value with lower bits to obtain the color level value with higher bits, the image color may be smoother and the color stratification may be eliminated, because the number of colors expressible by the color level value with the increased binary digit number is increased, and thus the variation between color level values of adjacent sub pixels is reduced, giving the smooth transition of color.

For example, for the three sub pixels shown in Table 4 and Table 6, if the color level values are 5, 5, and 6, change ratios between the adjacent sub pixels are 0% and 20% respectively; and if the color level values are 20, 22, and 24, change ratios between the adjacent sub pixels are 10% and 9% respectively. Obviously, the processed color level values change more gently, thus avoiding the drastic variation in the color level values, and avoiding the image color stratification.

Meanwhile, if the color level value is changed from 8-bit to 10-bit, the maximum number of variable colors corresponding to each sub pixel is increased from $2^6$ to $2^8$. Then, taking the sub pixel 21-G as an example, relative color level values are $5/2^8$ and $20/2^{10}$ respectively, which actually do not change. Thus, the supplementing process does not have a bad effect on the sub pixels, which are not processed with the supplementing operation.

Figure 5:
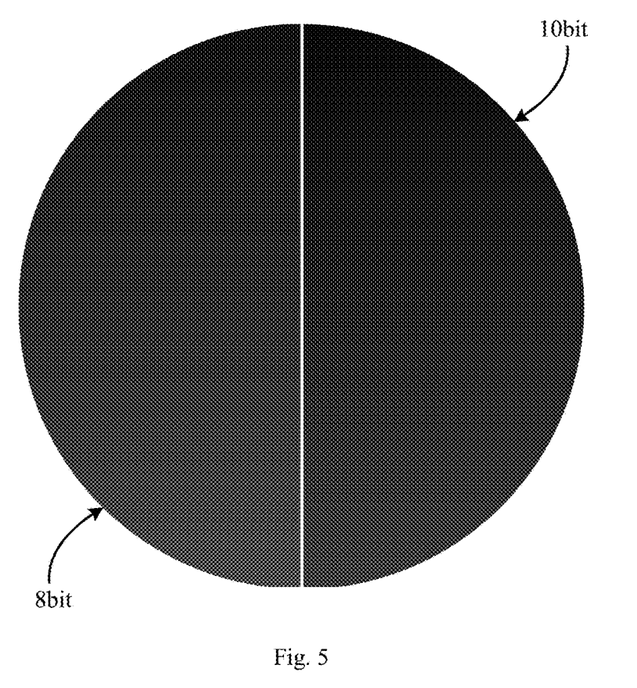
FIG. 5 is a schematic diagram of an image to be processed and an image after being processed based on a technique solution of the present disclosure according to an exemplary embodiment.

For example, FIG. 5 is a schematic diagram of an image to be processed and an image after being processed based on a technical solution of the present disclosure according to an exemplary embodiment. As shown in FIG. 5, "black" is used for both left and right diagrams for illustration purpose, in which, the left diagram shows an image to be processed using the 8-bit color level value, and the right diagram shows a processed image with the 10-bit color level value. It is clear in FIG. 5 that, the left diagram with the 8-bit color level value has an obvious color stratification, when representing the color transition from a darker color to a lighter color (from top to bottom), forming a lot of horizontal banded stripes; but in the right processed image with the 10-bit color level value, by performing the supplementing process on the content-associated sub pixels, a display optimization is performed on adjacent banded stripes in the left diagram, thus eliminating the image color stratification visually, and obtaining a more natural and harmonious color transition effect.

Corresponding to the above-described exemplary embodiments of the image processing method, exemplary embodiments of an image processing device are also provided in the present disclosure.

Figure 6:
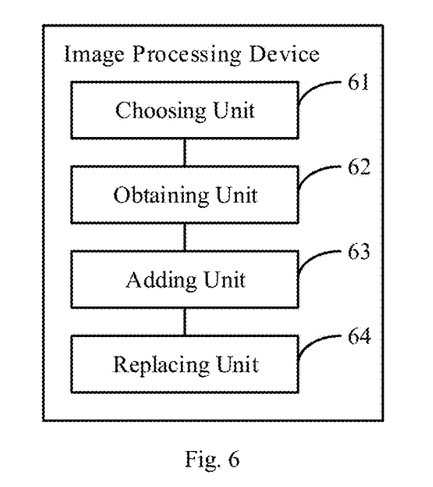
FIGS. 6-11 are block diagrams of image processing devices according to exemplary embodiments.

FIG. 6 is a block diagram of an image processing device according to an exemplary embodiment. As shown in FIG. 6, the image processing device comprises a choosing unit 61, an obtaining unit 62, an adding unit 63, and a replacing unit 64.

The choosing unit 61 is configured to choose content-associated sub pixels in an image to be processed.

The obtaining unit 62 is configured to obtain an initial color level value of each of the content-associated sub pixels in the image to be processed.

The adding unit 63 is configured to add at least one digit to the end of the initial color level value, and assign a preset value to each added digit, so as to obtain a processed color level value.

The replacing unit 64 is configured to replace the initial color level value with the processed color level value.

Figure 7:
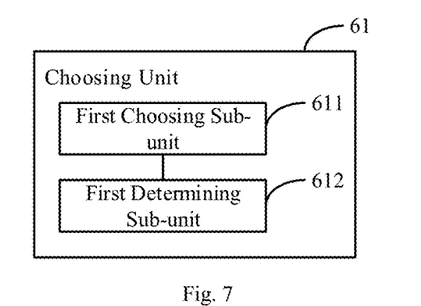

FIG. 7 is a block diagram of an image processing device according to another exemplary embodiment. As shown in FIG. 7, based on the exemplary embodiment shown in FIG. 6, the choosing unit 61 may comprise a first choosing sub-unit 611 and a first determining sub-unit 612.

The first choosing sub-unit 611 is configured to choose adjacent sub pixels in the image to be processed.

The first determining sub-unit is configured to determine that the adjacent sub pixels are content-associated sub pixels, if there is a difference between the initial color level values of the arbitrary adjacent sub pixels, and the difference is less than or equal to a preset value.

Figure 8:
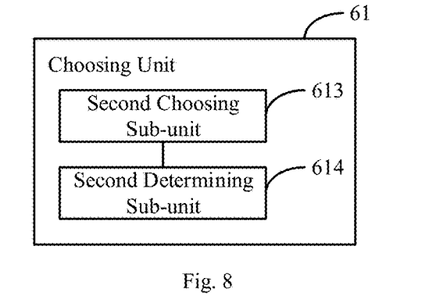

FIG. 8 is a block diagram of another image processing device according to an exemplary embodiment. As shown in FIG. 8, based on the exemplary embodiment shown in FIG. 6, the choosing unit 61 may comprise a second choosing sub-unit 613 and a second determining sub-unit 614.

The second choosing sub-unit 613 is configured to choose adjacent pixels in the image to be processed.

The second determining sub-unit 614 is configured to determine that the sub pixels in the same color channel of the adjacent sub pixels are content-associated sub pixels, if there is a difference between the initial color level values of sub pixels in a same color channel of the adjacent pixels, and the difference is less than or equal to a preset value.

Alternatively, in the exemplary embodiments in FIG. 7 or FIG. 8, the preset value has an inverse correlation with a pixel density of a display for the image to be processed.

Figure 9:
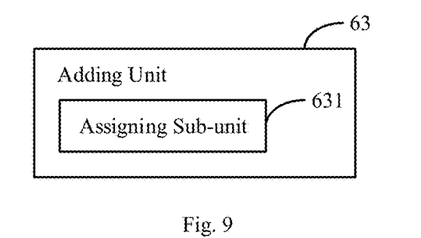

FIG. 9 is a block diagram of another image processing device according to an exemplary embodiment. As shown in FIG. 9, based on the exemplary embodiment shown in FIG. 6, the adding unit 63 may comprise an assigning sub-unit 631.

The assigning sub-unit 631 is configured to assign a random number to each added digit, so as to obtain the processed color level value.

It should be noted that, the structure of the assigning sub-unit 631 in the device embodiment as shown in FIG. 9 may also be included in the device embodiment as shown in FIG. 7 or FIG. 8, which should not be limited in the present disclosure.

Figure 10:
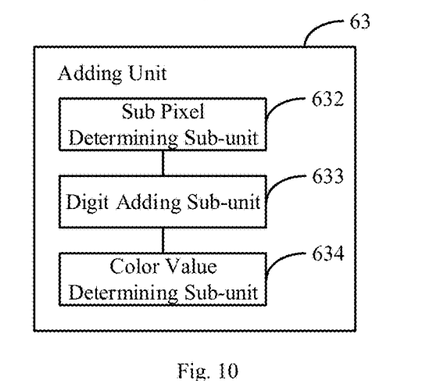

FIG. 10 is a block diagram of another image processing device according to an exemplary embodiment. As shown in FIG. 10, based on the exemplary embodiment shown in FIG. 6, the adding unit 63 may comprise a sub pixel determining sub-unit 632, a digit adding sub-unit 633, and a color level determining sub-unit 634.

The sub pixel determining sub-unit 632 is configured to determine associated sub pixels in a preset association area of each content-associated sub pixel.

The digit adding sub-unit 633 is configured to add at least one digit to the end of the initial color level value of each associated sub pixel, and assign 0 to each added digit, so as to obtain a preliminary value of processed color level, in which each associated sub pixel is added with a same number of digits.

The color level determining sub-unit 634 is configured to determine the processed color level value of the content-associated sub pixel according to a value range corresponding to the preliminary values of processed color levels of the associated sub pixels, in which the processed color level value is within the value range.

It should be noted that, the structure of the assigning sub-unit 631 in the device embodiment shown in FIG. 9 may also be included in the device embodiment shown in FIG. 7 or FIG. 8, which should not be limited in the present disclosure.

Alternatively, the associated sub pixels comprise all sub pixels in the preset association area; or the associated sub pixels comprise sub pixels in the preset association area, and belong to a same color channel.

Figure 11:
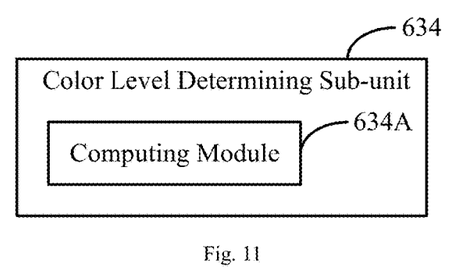

FIG. 11 is a block diagram of another image processing device according to an exemplary embodiment. As shown in FIG. 11, based on the exemplary embodiment shown in FIG. 10, the color level determining sub-unit 634 may comprise a computing module 634A.

The computing module 634A is configured to calculate an average value of the preliminary values of processed color levels corresponding to the associated sub pixels, in which the average value is the processed color level value of the content-associated sub pixel.

With respect to the devices in the above embodiments, the specific operation modes of individual modules therein have been described in detail in the embodiments regarding the image processing method, which will not be elaborated herein.

With respect to the device embodiments, relevant content may refer to explanation in the method embodiments, since the device embodiments are described based on the method embodiments. The device embodiments described above are merely exemplary, in which the units illustrated as separate components may be or may not be physically separated, the components illustrated as units may be or may not be physical units, i.e., may be located at one place, or may be distributed on multiple network units. The objectives of the present disclosure may be realized by selecting some or all of the modules according to actual demands. It may be understood and implemented by those skilled in the art without creative labor.

Figure 12:
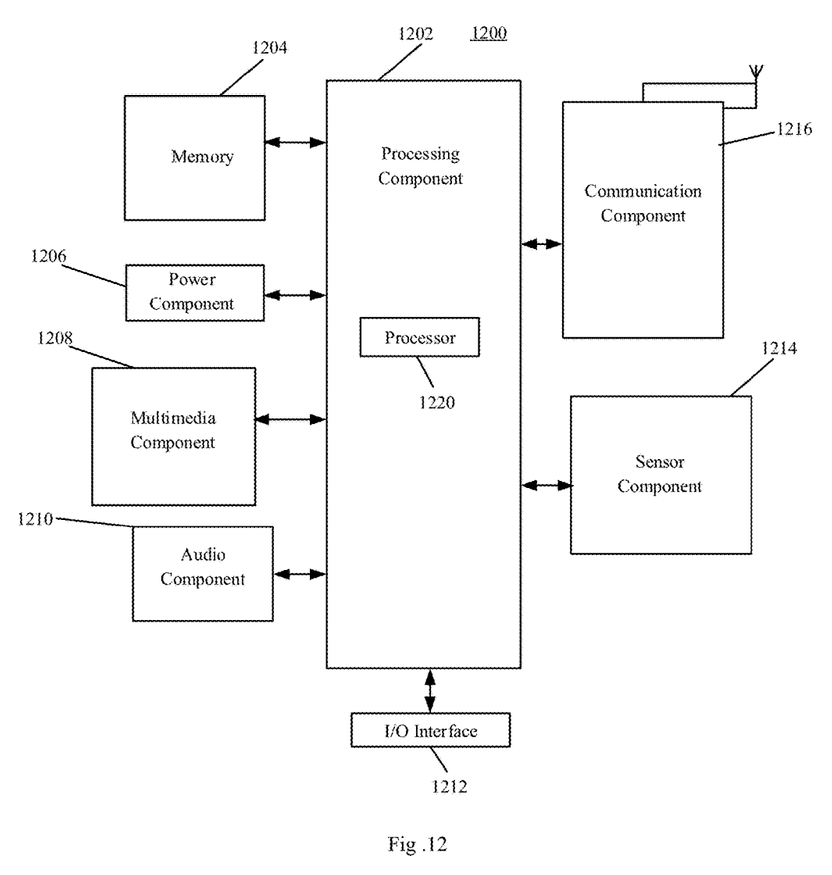
FIG. 12 is a schematic diagram of a device for processing images according to an exemplary embodiment.

FIG. 12 is a schematic diagram of a device 1200 for processing images according to an exemplary embodiment. For example, the device 1200 may be a mobile phone, a computer, a digital broadcasting terminal, a messaging device, a game console, a tablet device, a fitness equipment, a Personal Digital Assistant PDA, etc.

As shown in FIG. 12, the device 1200 may comprise the following one or more components: a processing component 1202, a memory 1204, a power component 1206, a multimedia component 1208, an audio component 1210, an Input/Output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may comprise one or more processors 1220 to execute instructions to perform all or part of the steps in the methods described above. Moreover, the processing component 1202 may comprise one or more modules, which facilitate the interaction between the processing component 1202 and other components. For instance, the processing component 1202 may comprise a multimedia module to facilitate the interaction between the multimedia component 1208 and the processing component 1202.

The memory 1204 is configured to store various types of data to support the operation of the device 1200. Examples of such data comprise instructions for any applications or methods operated on the device 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the device 1200. The power component 1206 may comprise a power management system, one or more power sources, and any other components associated with the generation, management, and distribution of power in the device 1200.

The multimedia component 1208 comprises a screen providing an output interface between the device 1200 and the user. In some embodiments, the screen may comprise a liquid crystal display (LCD) and a touch panel (TP). If the screen comprises the touch panel, the screen may be implemented as a touch screen to receive input signals from the user. The touch panel comprises one or more touch sensors to sense touches, swipes, and other gestures performed on the touch panel. The touch sensors may not only sense a boundary of a touch or swipe action, but also sense a duration time and a pressure associated with the touch or swipe action. In some embodiments, the multimedia component 1208 comprises a front camera and/or a rear camera. The front camera and the rear camera may receive external multimedia data while the device 1200 is in an operation mode, such as a photographing mode or a video mode. Each of the front camera and the rear camera may be a fixed optical lens system or a system having focus and optical zoom capability.

The audio component 1210 is configured to output and/or input audio signals. For example, the audio component 1210 comprises a microphone (MIC) configured to receive an external audio signal when the intelligent device 1200 is in an operation mode, such as a call mode, a recording mode, and a voice recognition mode. The received audio signal may be further stored in the memory 1204 or transmitted via the communication component 1216. In some embodiments, the audio component 1210 further comprises a speaker to output audio signals.

The I/O interface 1212 provides an interface for the processing component 1202 and peripheral interface modules, such as a keyboard, a click wheel, buttons, and the like. The buttons may comprise, but are not limited to, a home button, a volume button, a starting button, and a locking button.

The sensor component 1214 comprises one or more sensors to provide status assessments of various aspects of the device 1200. For instance, the sensor component 1214 may detect an open/closed status of the device 1200 and relative positioning of components (e.g. the display and the keypad of the device 1200). The sensor component 1214 may also detect a change in position of the device 1200 or of a component in the device 1200, a presence or absence of user contact with the device 1200, an orientation or an acceleration/deceleration of the device 1200, and a change in temperature of the device 1200. The sensor component 1214 may comprise a proximity sensor configured to detect the presence of nearby objects without any physical contact. The sensor component 1214 may also comprise a light sensor, such as a CMOS or CCD image sensor, for use in imaging applications. In some embodiments, the sensor component 1214 may also comprise an accelerometer sensor, a gyroscope sensor, a magnetic sensor, a pressure sensor, or a temperature sensor.

The communication component 1216 is configured to facilitate wired or wireless communication between the device 1200 and other devices. The device 1200 can access a wireless network based on a communication standard, such as WIFI, 2G, or 3G, or a combination thereof. In one exemplary embodiment, the communication component 1216 receives a broadcast signal or broadcast associated information from an external broadcast management system via a broadcast channel. In one exemplary embodiment, the communication component 1216 further comprises a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the methods described above.

In exemplary embodiments, there is also provided a non-transitory computer readable storage medium comprising instructions, such as the memory 1204 comprising instructions. The above instructions are executable by the processor 1220 in the device 1200, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and comprising such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing form the scope thereof. It is intended that the scope of the invention only be limited by the appended claims.

What is claimed is:

1. An image processing method, comprising:
    choosing content-associated sub pixels in an image to be processed;
    obtaining an initial color level value of each of the content-associated sub pixels in the image to be processed;
    adding at least one digit to an end of the initial color level value, and assigning a preset value to each added digit, so as to obtain a processed color level value; and
    replacing the initial color level value with the processed color level value;
    wherein assigning the preset value to each added digit so as to obtain the processed color level value comprises:
        determining associated sub pixels in a preset association area of each content-associated sub pixel;
        adding at least one digit to the end of the initial color level value of each associated sub pixel, and assigning 0 to each added digit, so as to obtain an initially processed color level value, wherein each associated sub pixel is added with a same number of digits; and
        determining the processed color level value of the content-associated sub pixel according to a value range corresponding to the initially processed color level values of the associated sub pixels, wherein the processed color level value is in the value range.

2. The image processing method according to claim 1, wherein choosing the content-associated sub pixels in the image to be processed comprises:
    choosing adjacent sub pixels in the image to be processed; and
    determining that the adjacent sub pixels are the content-associated sub pixels, if there is a difference between the initial color level values of the adjacent sub pixels and the difference is less than or equal to a preset value.

3. The image processing method according to claim 2, wherein the preset value has an inverse correlation with a pixel density of a display for the image to be processed.

4. The image processing method according to claim 1, wherein choosing the content-associated sub pixels in the image to be processed comprises:
choosing adjacent pixels in the image to be processed; and
determining that the sub pixels in a same color channel of the adjacent pixels are content-associated sub pixels, if there is a difference between the initial color level values of sub pixels in the same color channel of the adjacent pixels and the difference is less than or equal to a preset value.

5. The image processing method according to claim 4, wherein the preset value has an inverse correlation with a pixel density of a display for the image to be processed.

6. The image processing method according to claim 1, wherein assigning the preset value to each added digit so as to obtain the processed color level value comprises:
assigning a random number to each added digit, so as to obtain the processed color level value.

7. The image processing method according to claim 1, wherein the associated sub pixels comprise all of sub pixels in the preset association area or a part of the sub pixels in the preset association area which belong to a same color channel as the content-associated sub pixel.

8. The image processing method according to claim 1, wherein determining the processed color level value of the content-associated sub pixel according to the value range corresponding to the initially processed color level values of the associated sub pixels comprises:
calculating an average value of the initially processed color level values corresponding to the associated sub pixels, wherein the average value is the processed color level value of the content-associated sub pixel.

9. An electronic device, comprising:
a processor; and
a memory, configured to store instructions executable by the processor;
wherein, the processor is configured to:
choose content-associated sub pixels in an image to be processed;
obtain an initial color level value of each of the content-associated sub pixels in the image to be processed;
add at least one digit to an end of the initial color level value, and assign a preset value to each added digit, so as to obtain a processed color level value; and
replace the initial color level value with the processed color level value;
wherein the processor is configured to:
determine associated sub pixels in a preset association area of each content-associated sub pixel;
add at least one digit to the end of the initial color level value of each associated sub pixel, and assign 0 to each added digit, so as to obtain an initially processed color level value, wherein each associated sub pixel is added with a same number of digits; and
determine the processed color level value of the content-associated sub pixel according to a value range corresponding to the initially processed color level values of the associated sub pixels, wherein the processed color level value is in the value range.

10. The electronic device according to claim 9, wherein the processor is configured to:
choose adjacent sub pixels in the image to be processed; and
determine that the adjacent sub pixels are the content-associated sub pixels, if there is a difference between the initial color level values of the adjacent sub pixels, and the difference is less than or equal to a preset value.

11. The electronic device according to claim 10, wherein the preset value has an inverse correlation with a pixel density of a display for the image to be processed.

12. The electronic device according to claim 9, wherein the processor is configured to:
choose adjacent pixels in the image to be processed; and
determine that the sub pixels in a same color channel of the adjacent pixels are content-associated sub pixels, if there is a difference between the initial color level values of sub pixels in the same color channel of the adjacent pixels, and the difference is less than or equal to a preset value.

13. The electronic device according to claim 12, wherein the preset value has an inverse correlation with a pixel density of a display for the image to be processed.

14. The electronic device according to claim 9, wherein the processor is configured to:
assign a random number to each added digit, so as to obtain the processed color level value.

15. The electronic device according to claim 9, wherein the associated sub pixels comprise all of sub pixels in the preset association area or a part of sub pixels in the preset association area which belong to a same color channel as the content-associated sub pixel.

16. The electronic device according to claim 9, wherein the processor is configured to:
calculate an average value of the initially processed color level values corresponding to the associated sub pixels, wherein the average value is the processed color level value of the content-associated sub pixel.

17. A non-transitory computer-readable storage medium having stored therein instructions that, when executed by a processor of an electronic device, causes the electronic device to perform an image processing method, the method comprising:
choosing content-associated sub pixels in an image to be processed;
obtaining an initial color level value of each of the content-associated sub pixels in the image to be processed;
adding at least one digit to an end of the initial color level value, and assigning a preset value to each added digit, so as to obtain a processed color level value; and
replacing the initial color level value with the processed color level value;
wherein assigning the preset value to each added digit so as to obtain the processed color level value comprises:
determining associated sub pixels in a preset association area of each content-associated sub pixel;
adding at least one digit to the end of the initial color level value of each associated sub pixel, and assigning 0 to each added digit, so as to obtain an initially processed color level value, wherein each associated sub pixel is added with a same number of digits; and
determining the processed color level value of the content-associated sub pixel according to a value range corresponding to the initially processed color level values of the associated sub pixels, wherein the processed color level value is in the value range.

* * * * *